United States Patent [19]
Christensen

[11] 3,967,168
[45] June 29, 1976

[54] ELECTRICAL CAPACITOR HAVING ALTERNATING METALLIZED NONHEAT-SHRINKABLE DIELECTRIC LAYERS AND HEAT-SHRINKABLE DIELECTRIC LAYERS

[75] Inventor: Kenneth Christensen, Alexandria, Va.

[73] Assignee: Illinois Tool Works Inc., Chicago, Ill.

[22] Filed: June 26, 1975

[21] Appl. No.: 590,641

[52] U.S. Cl. .............................. 317/258; 317/260
[51] Int. Cl.² .................... H01G 1/13; H01G 4/20
[58] Field of Search ........................ 317/260, 258

[56] References Cited
UNITED STATES PATENTS

| | | | |
|---|---|---|---|
| 3,049,651 | 8/1962 | Adelson et al. | 317/260 |
| 3,134,059 | 5/1964 | Rayburn | 317/260 |
| 3,364,401 | 1/1968 | Rayburn | 317/260 |

*Primary Examiner*—E. A. Goldberg
*Attorney, Agent, or Firm*—Glenn W. Bowen; Robert W. Beart

[57] ABSTRACT

An electrical capacitor is formed by winding alternating layers of single-sided metallized nonheat-shrinkable dielectric material and of a heat-shrinkable dielectric material together. Radial leads are secured to the ends of the capacitor after it is wound by heating the leads and forcing them into the ends of the dielectric materials. The heat-shrinkable layers effectively seal off the electrodes from each other. In addition, the heat-shrinkable dielectric layers may provide higher current capacities, improved dissipation factor, better control over the temperature vs. capacitance characteristic of the capacitor, improved corona threshold voltage and improved control over the final value of the wound capacitor.

2 Claims, 3 Drawing Figures

ELECTRICAL CAPACITOR HAVING ALTERNATING METALLIZED NONHEAT-SHRINKABLE DIELECTRIC LAYERS AND HEAT-SHRINKABLE DIELECTRIC LAYERS

BACKGROUND OF THE INVENTION

Wound electrical capacitors are used in large quantities in electrical devices because of their reliability, their desirable electrical characteristics and their relatively low cost. Radial lead capacitors are preferred in many applications over axial lead capacitors because of the space that is saved by their use and also because they may be directly inserted into a printed circuit board without bending of their leads. The problem of securing radial leads to the electrodes of wound capacitors with a strong, reliable bond was solved by the important contribution of Charles C. Rayburn in U.S. Pat. No. 3,040,415 and 3,134,059. The lead connection procedure of these Rayburn patents consists essentially of heating the electrical leads and forcing them, while heated, into dielectric layers, which extend outwardly at the edge of the capacitor so that the leads become embedded in the extended dielectric layers and are thereby firmly held in contact with the electrodes by melted dielectric after it is cooled.

The use of a single-sided metallized dielectric layer to form wound capacitors is highly desirable at the present time, in view of the rapidly increasing cost of supplies, especially the cost of conductive metals which make the use of the much thicker foil layers that have been used as alternatives to metallized dielectric layers relatively more expensive. The method of the Rayburn patents has been proposed for use in conjunction with alternating layers of single-sided metallized dielectric layers in which the dielectric layers extend from the edges of the capacitor in the opposite directions, as shown in FIG. 5 of the Rayburn Pat. No. 3,040,415; but the addition of alternating layers of heat-shrinkable material was not contemplated by these patents.

Another wound capacitor which used single-sided metallized layers is shown in Rayburn Pat. No. 3,364,401 in which an unmetallized margin is provided along one edge of each of the dielectric layers. However, the cost of providing the unmetallized margin on the dielectric material makes this type of single-sided metallized capacitor relatively expensive to produce.

Other types of capacitors have been constructed using metallized dielectric layers. For example, Great Britain Pat. No. 686,293 shows a capacitor which is made by using double-sided metallized layers that are separated by dielectric layers. The capacitor of this patent is wound so that the voids are substantially eliminated and the ends are sprayed with a metallizing end spray material. However, this capacitor requires two metallized surfaces rather than just one; and in addition, both of the metallized surfaces must be provided with a margin which makes the material costs relatively even more expensive than that of the previously mentioned Rayburn Pat. No. 3,364,401. Also, the dielectric material of the double-sided metallized layer does not contribute substantially to the value of the capacitor, and thus a relatively thick capacitor results for the amount of dielectric material that is used.

Electrical capacitors have also been constructed in which solid foil layers extend at opposite edges of the capacitor. An example of this type of a construction in which the foil layers are external beyond each other to a substantial extent is shown in Rayburn Pat. No. 3,267,343. Another example of the construction o a foil layer capacitor is shown in Bilsing et al Pat. No. 3,163,917. Although the foil layers of the Bilsing et al patent are separated by heat-shrinkable layers, the capacitor of the Bilsing et al patent utilizes axial leads, rather than radial leads and a separate insulating tube is used to secure the leads into the wound capacitor structure.

The capacitor of the present invention, by contrast, is formed by utilizing alternating layers of a heat-shrinkable dielectric material and a metallized nonheat-shrinkable dielectric material. The metallized nonheat-shrinkable dielectric layers extend beyond the heat-shrinkable dielectric layers at opposite edges of the capacitor and radial leads are secured to the edges of the capacitor in order to make contact with the metallized electrode layers. The leads are secured by heating them and forcing them into the edges of the capacitor where they melt the outer portions of the heat-shrinkable layers and preferably also the nonheat-shrinkable layers. Following the attachment of the leads to the capacitor body, a metallized end spray operation is performed which increases the retention strength of the leads and also reduces the resistance of the capacitor.

A capacitor constructed in accordance with the present invention has a number of decided advantages. These include:

1. Single-sided metallized dielectric layers may be employed in preference to foil electrode layers, thereby appreciably reducing the amount of metal and material costs required in the construction of the capacitor;

2. Single-sided metallized dielectric layers are employed which do not have margins, thereby further reducing the cost of constructing a wound capacitor;

3. Radial leads are provied which reduce the size of the capacitor and which allow for easy insertion of the capacitor in printed circuit board applications;

4. The radial leads of the capacitor of the present invention are securely mounted to the edges of the capacitor since they are held in place by melted dielectric material;

5. Increased end termination strength is provided by the increased gap spacing between the electrode layers since larger particles size end spray material may be employed;

6. The use of heat-shrinkable material as a separating layer makes it possible to provide for higher current capacities, improved dissipation factor, better control over the temperature vs. capacitance characteristic, improved corona threshold voltage and improved control over the final value of the wound capacitor;

7. No additional lead holding component is required to be included in the capacitor during construction; and 8. Voltage ratings may be adjusted with a large degree of flexibility due to the ease of adjusting the offset at the edge of the capacitor of the heat-shrinkable dielectric layers with respect to the metallized nonheat-shrinkable dielectric layers; and 9. Different combinations of dielectric materials can be used to change the characteristics of the capacitor so as to give a desirable temperature vs. capacitance curve or to improve corona threshold or dissipation factor, for example.

DESCRIPTION OF THE DRAWINGS

The invention is described by reference to the accompanying drawings in which.

TECHNICAL DESCRIPTION OF THE INVENTION

Figure 1:
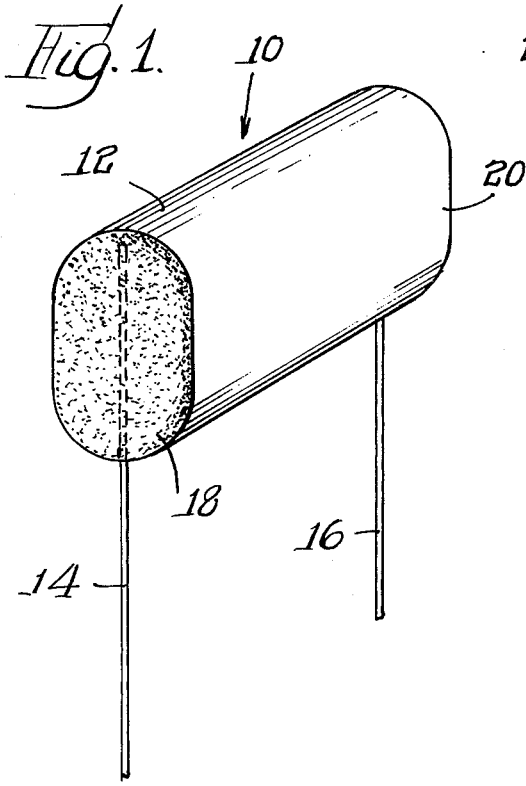
FIG. 1 is a perspective view of the capacitor assembly of this invention which shows radial leads that are attached to the ends of the capacitor body which has been compressed radially with respect to the winding axis to eliminate the space occupied by the mandrel during the winding operation.
Figure 2:
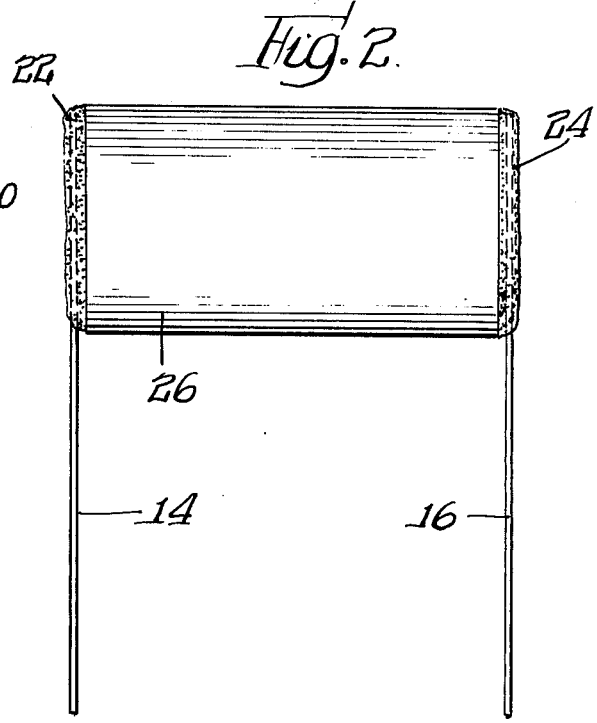
FIG. 2 is a side view of the capacitor assembly which has been tamped axially of the capacitor body so as to compress the margins of the metallized dielectric strips with the electrical leads being secured within the ends of the capacitor body.

A capacitor constructed in accordance with the present invention is shown in FIGS. 1 and 2 wherein the capacitor is represented by the reference numeral 10. The body 12 of the capacitor 10 has a pair of radial leads 14, 16 which are secured to its end faces 18, 20 in a manner which is described subsequently in more detail. After the leads 14, 16 are secured to the end faces 18, 20 of the body 12 so that they are securely held in place and in contact with the electrodes of the capacitor 10, an end spray 22, 24 of a conductive metal, such as aluminum or other suitable conductive end spray material, is applied to the ends 18, 20, respectively, to connect the edges of the electrodes at the ends of the capacitor body 12 together thereby providing firm support for the leads 14, 16 and also reducing the resistance of the capacitor. An outer coating of a dielectric material 26 may be wrapped around the entire capacitor 10 and heat-sealed to itself to provide an outer dielectric coating, if desired.

Figure 3:
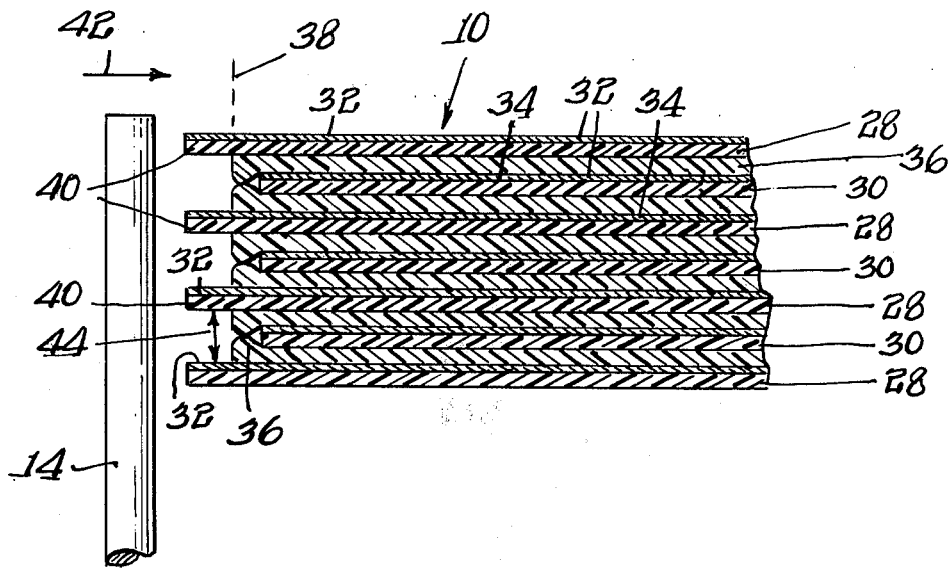
FIG. 3 is a partial enlarged sectional view of a capacitor assembly which shows in detail the alternating metallized dielectric layers and heat-shrinkable dielectric layers that make up the capacitor along with one electrical lead that is shown as moving towards the edge of the wound capacitor prior to its being secured to the capacitor body by melted dielectric.

The partial cross-sectional view of FIG. 3 shows the layer arrangement of the capacitor 10 of the present invention in which a plurality of nonheat-shrinkable dielectric layers 28 of a material such as polyester extend beyond the remaining layers of the capacitor on the left hand side of FIG. 3; while the layers 30 extend on the right hand side of FIG. 3, which is not shown because of the enlarged scale of the drawings. Each of the layers 28, 30, respectively, contain a metallized conductive layer, such as the layer 32, 34 which are deposited on and firmly adhere to the layers 28, 30 respectively. Between each of the dielectric layes 28, 30 there is a separation layer of a heat-shrinkable material, i.e., a material which is bi-axially oriented so that upon heating it will shrink. Heat-shrinkable layers 36 may be formed of polyester, polypropylene, polystyrene or other suitable material. The edges of the layers 36 extend beyond the left hand edges extension 38 of the electrodes 34 and the dielectric layers 30.

The capacitor is first wound on a mandrel in a conventional manner and after winding and removal from the mandrel, it is placed in an oven where the heat-shrinkable layers 36 shrink thereby sealing off the ends of the electrodes 34 on the left hand side of the capacitor, as shown in FIG. 3; and the electrodes 32 on the right hand side of the capacitor, which is not shown. The capacitor is tamped to form the compressed, sometimes reversed, slightly oval compression, which is shown in FIG. 1 to make a compact structure which minimizes the voids in the windings. Tamping may occur after or before the heat-shrinking operation. Following this tamping procedure, the leads 14, 16 are heated and are forced towards the capacitor body structure 12, as shown in FIG. 3 by the direction arrow 42, so that the heated lead 14 melts the extending portions 40 of the dielectric layers 28 and preferably the other portions of the heat-shrinkable layers 36 also, thereby firmly securing the lead 14 in place. The lead 16, of course, is secured in a similar manner to the other edge of the capacitor. Following attachment of the leads to the capacitor, the conductive metal spray overcoats 22, 24 on the ends of the capacitor 18, 10 are applied. The purpose of the end spray is to improve the strength of the bond of the leads to the capacitor body and also to provide a conductive coating between the respective electrodes 32 at one end of the capacitor and the electrodes 34 at the opposite ends of the capacitor in order to reduce its resistance.

As an example, the thickness of the nonheat-shrinkable metallized dielectric layers 28 of the present invention may be approximately 0.00024 inches, while the heat-shrinkable dielectric layers may be approximately 0.0005 inches or about twice as thick as the metallized dielectric layers. In making the heat-shrinkable dielectric layers substantially thicker than the nonheat-shrinkable dielectric layers, the gap spacing 44 between the electrodes, such as the electrodes 32, at the ends of the capacitor is substantially increased. This is another advantage of the present invention in that the leads are thereby more firmly secured by the end spray since larger particles of conductive material will be driven between the gaps, thus increasing the strength of the lead termination.

The invention is claimed as follows:

1. A convolutely wound capacitor having a first and a second edge comprising a first dielectric layer with a first conductive electrode layer thereon which extends outwardly from said first edge from said wound capacitor, a second dielectric layer which has a second metallized electrode layer thereon which extends outwardly from said second opposite edge of said capacitor, said first and second dielectric layers being comprised of a nonheat-shrinkable dielectric material, a third dielectric layer of a heat-shrinkable material disposed between said first and second dielectric layers, a fourth layer of heat-shrinkable dielectric material substantially aligned with said third heat-shrinkable layer material and positioned so that said second dielectric layer is positioned intermediate said third or fourth dielectric layers, said third and fourth dielectric layers being heat-treated so that they seal off one end of said second conductive layers from the same end of said first conductive layers and so that they also seal off the opposite end of said first conductive layers from the same end of said second conductive layers, and first and second electrical leads each of which is forced into one edge of said capacitor so that each of said leads are held in firm electrical contact with one of said first or said second electrode layers by melted portions of said dielectric layers.

2. A capacitor as claimed in claim 1 wherein said heat-shrinkable dielectric layers are substantially thicker than said nonheat-shrinkable dielectric layers and a conductive material is sprayed over said edges of said capacitor after said leads are imbedded therein.

* * * * *